Figure 1:
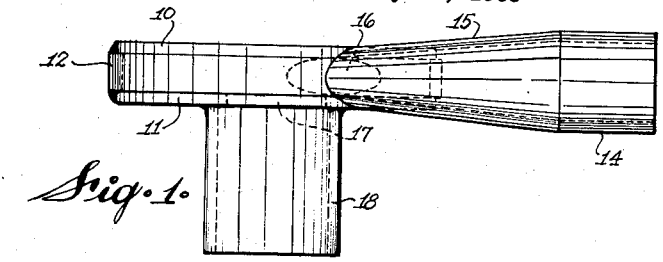

Nov. 2, 1965  J. D. BOADWAY  3,215,165
METHOD AND DEVICE FOR THE CONTROL OF FLUID FLOW
Filed May 27, 1963

INVENTOR
John D. Boadway
BY James A. Hamel
PATENT AGENT

United States Patent Office 3,215,165
Patented Nov. 2, 1965

3,215,165
METHOD AND DEVICE FOR THE CONTROL
OF FLUID FLOW
John D. Boadway, Grand'Mere, Quebec, Canada, assignor to Consolidated Paper (Bahamas), Limited, Nassau, Bahamas
Filed May 27, 1963, Ser. No. 283,484
3 Claims. (Cl. 138—46)

This is a continuation-in-part of United States patent application Serial No. 78,386, filed December 27, 1960, and now abandoned.

This invention relates to a method of controlling fluid flow and a device therefor, and in particular, it relates to a method and device for controlling the rate of flow of a fluid through a piping system.

The conventional method of controlling the rate of flow of a liquid through a piping system is to control the size of an opening through which the liquid must pass. There are several types of valve that can be used to control the size of an opening. Such valves essentially create a pressure drop or hydraulic gradient across the valve which corresponds to the liquid velocity head in the throttling orifice. The velocity head is dissipated in turbulence. The general mathematical formula governing such throttling devices is:

$$Q = C_d A \cdot \sqrt{2gH} \quad (1)$$

where
$Q$ = the flow through the device,
$C_d$ = the coefficient of discharge dependent on the shape of the liquid jet in the opening,
$A$ = the area of the throttling opening,
$g$ = the gravitational constant,
$H$ = the hydraulic gradient across the throttling opening.

Thus, where the pressure drop is fixed, the flow may be controlled by varying the area of the opening, or, where the flow is fixed, the pressure drop may be controlled by varying the area of the opening.

As is well known, and as set forth above, the control of liquid flow is closely connected with or is dependent on the size of the opening through which the liquid passes. In many manufacturing processes, it is necessary to handle and control a liquid which contains solid or semi-solid particles. When the particle size is the same as the size of the opening, much difficulty is experienced with plugging of the openings. With prior art valves used to control the rate of flow of a liquid containing solids, it is apparent that the valve can be closed only until the opening begins to plug. This is a distinct limitation to control by such a valve and is one of the major disadvantages thereof.

Further, with the use of prior art valves, the velocity of the liquid through the valve is greatest at the orifice. Because of the high velocity, increased cavitation and wear occurs at the orifice. As the orifice is enlarged by the excess wear, the flow increases.

This invention overcomes the disadvantages inherent in prior art devices by transferring the pressure drop from the orifice to a vortex.

It is therefore an object of this invention to provide an improved method of controlling fluid flow which involves the use of a vortex to provide a pressure drop.

It is also an object of this invention to provide a device for controlling fluid flow which, for a given flow, has a larger opening than prior art valves.

It is another object of this invention to minimize wear at the opening in a flow control device by increasing the opening size and decreasing the velocity through the opening.

Figure 2:
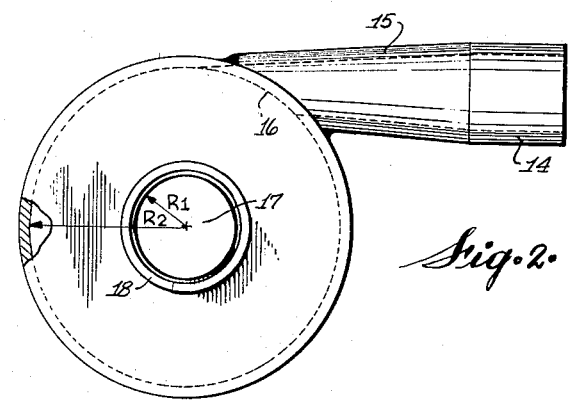
Figure 4:
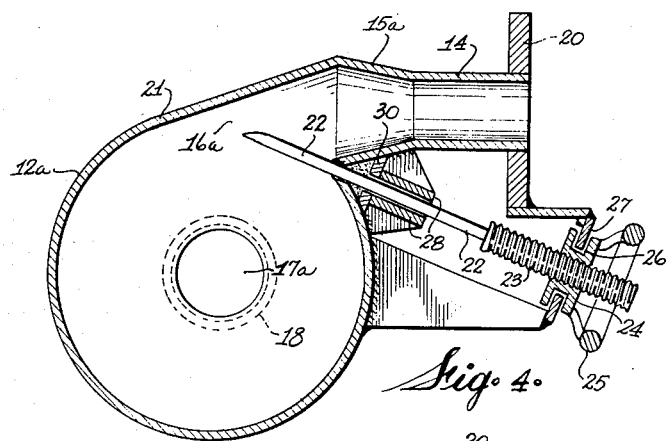
Figure 3:
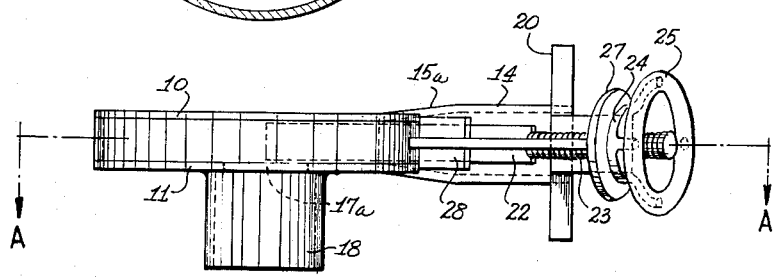

Other objects and advantages of the invention will appear from a detailed description in conjunction with illustrative embodiments shown in the accompanying drawings, in which:

FIGURE 1 is a simplified plan elevation of a control device in accordance with one embodiment of the invention, and which is useful in explaining the operation of the invention, FIGURE 2 is a side elevation of the device of FIGURE 1, FIGURE 3 is an elevation of a control device in accordance with another embodiment of the invention, and, FIGURE 4 is a sectional view taken along A—A of FIGURE 3.

Briefly, the invention comprises a device into which the liquid whose flow is to be controlled is introduced tangentially into an enclosure or chamber to create a vortex within the enclosure. The liquid is discharged from a central opening in an end of the enclosure. The pressure drop in the device is across the vortex and not across the orifice as in prior art devices.

A short discussion of vortical flow may aid in an understanding of the invention. Considering first the classic vortex or free vortex in which there is no friction loss, the usual example is a tangential entry between two parallel discs with an exit or discharge from a centrally located opening in one of the discs. Such a device is illustrated in FIGURES 1 and 2.

In a free vortex the relationship between velocity and radius is:

$$v = \frac{k}{r} \quad (2)$$

where
$v$ = the velocity at radius of rotation "$r$,"
$r$ = a radius of rotation,
$k$ = a constant.

In such a vortex the velocity of the rotating liquid creates a centrifugal force so that there is a pressure at the outside of the vortex and a pressure gradient across the vortex. Since, in a free vortex, there is no friction loss, the pressure head at the outer fringe of the vortex is converted into tangential velocity. The velocity is limited because the available pressure is limited. At the inside of the vortex, all the pressure is converted into velocity and there is a liquid free space. The liquid will discharge through the central opening as a hollow cone spray.

Referring now to the FIGURES 1 and 2, there is shown two spaced parallel discs 10 and 11, joined at the outer edge by a circular wall 12. An inlet pipe or conduit 14 is joined to a transition piece 15 to conduct a liquid to the device. In FIGURES 1 and 2, the transition piece 15 is shown as providing an entry area 16 having a curved periphery. Such transition pieces are well known as are transition pieces providing an entry area having straight walls, i.e. a rectangular entry area. Obviously such an alternative transition piece could be used to provide a rectangular entry area. The transition piece 15 meets the wall 12 substantially at a tangent so that a liquid entering the device passes through a fixed opening or entry area 16 to create a vortical flow. The entry radius is shown as $R_2$. It should be noted that the entry radius is not a radius of the entry area 16, but is rather the radius of curvature at which the liquid enters the vortex chamber. That is, the entry radius $R_2$ is the radius of the liquid flow adjacent wall 12. A discharge opening or exit area 17 is located centrally in disc 11. The exit radius, that is the radius of the exit area 17, is shown as $R_1$. A splash guard 18 is positioned around the discharge opening.

If a flow Q enters through entry 16 which may be said to have an area "A," the entry velocity is $Q/A$. This establishes one condition in the vortex at $R_2$ and the vortex constant is $$k = \frac{Q}{A} \cdot R_2 \tag{3}$$

Thus, the velocity at radius $R_1$ must be $$v_1 = \frac{Q}{A} \cdot \frac{R_2}{R_1} \tag{4}$$

If the velocity head at the entry 16 is assumed to be negligible compared to the velocity head at radius $R_1$, then the head loss across the device becomes equal to the velocity head at radius $R_1$.

$$H = \frac{v_1^2}{2g} = \frac{\left(\frac{Q}{A} \cdot \frac{R_2}{R_1}\right)^2}{2g} \tag{5}$$

where $H$ is the head loss across the device.

Expressing Equation 5 in terms of flow $Q$ $$Q = \frac{R_1}{R_2} \cdot A\sqrt{2gH} \tag{6}$$

It will be seen that Equation 6 is similar to Equation 1 for a straight orifice except that the radio of exit radius to entry radius replaces the coefficient of discharge. The coefficient of discharge may have as a lower limit a value of about 0.6 for a sharp-edged orifice. There is, however, almost no lower limit for the value of the ratio of exit radius to entry radius. The present invention is based on this. A device according to the present invention, for similar conditions of pressure, may have an entry area many times larger than the area of an orifice used to restrict flow by the same amount.

In practice, there will be a friction loss in the vortex, and there will be a departure from the free vortex velocity Equation 2. An equation expressing the velocity and allowing for friction loss could be set down as:

$$v = kr^n \tag{7}$$

where $n = $ a constant which may vary from $-1$ for no friction loss to $+1$ for complete loss of hydraulic energy by friction.

By integration process the pressure drop across such a vortex may be obtained which would give rise to an equation for flow as follows:

$$Q = \sqrt{\frac{n}{1 - 2\left(\frac{R_1}{R_2}\right)^{2n}}} \cdot A\sqrt{2gH} \tag{8}$$

If the application of this device is considered for the moment to be limited to cases where the entry radius $R_2$ is large compared to $R_1$ and where $n$ is from $-0.5$ to $-1.0$, then the factor $$\left(\frac{R_1}{R_2}\right)^{2n}$$

becomes large compared to 1 and Equation 8 can be simplified to $$Q = \sqrt{-n} \cdot \left(\frac{R_1}{R_2}\right)^n \cdot A\sqrt{2gH} \tag{9}$$

where $n = -1$ (no friction loss) Equation 9 becomes identical to Equation 6.

A specific example may illustrate the operation and advantages of the present invention more definitely.

*Example I*

Considering a device having the following dimensions:

Diameter of entry hole = ⅜″
Diameter of discs 10 and 11 = 3¼″
Spacing of discs 10 and 11 = ⅜″
Diameter of exit hole = ⅜″

For the particular device the value of $n$ was found to be $-0.5$.

For a pressure differential of 15 lbs./in.$^2$ the flow was 4 U.S. g.p.m. This flow is in accordance with Equation 9 in which the above values are substituted, that is, $$Q = \sqrt{0.5}\left(\frac{3}{26}\right)^{1/2} \cdot A\sqrt{2gH} = 4 \text{ U.S. g.p.m.} \tag{10}$$

Considering an orifice operating under these conditions, that is an orifice passing 4 U.S. g.p.m. with a pressure differential of 15 lbs./in.$^2$, it will be found that the orifice is approximately 3⁄16″ in diameter. Thus, it is apparent that for the same conditions in this example, a throttling device according to the present invention uses an opening that has a diameter double that of the orifice. This is a feature which adapts the present invention for use as a throttling device for solid-carrying liquids and by which the invention may be described as a "plug-free throttling device."

In the preceding example, the diameter of the exit hole is the same as the diameter of the entry hole, that is, the ratio $$\frac{\text{Exit area}}{\text{Entry area}} = 1$$

It will be seen that as long as this ratio equals or is greater than one, the exit hole will not take on the properties of an orifice. Thus in a preferred form of the invention, the ratio $$\frac{\text{Exit area}}{\text{Entry area}} \geq 1$$

The exit area cannot, of course, be increased indefinitely with respect to the entry area because it is necessary to maintain a desirable ratio of $R_1/R_2$ (see Equation 6) for efficient flow control without increasing the volume of the vortex chamber beyond practical limits. Other practical limitations such as flowable pressure drop across the entry, feed pressure and danger of blockage, etc. would enter into such a consideration. The following table is given as an indication only of the effect of increasing exit area. In the table the conditions of Example I are used for entry hole and size of vortex chamber, that is Diameter of entry hole = ⅜″ or 0.375″
Diameter of discs = 3¼″ or 3.25″
Pressure differential = 15 lb./in.$^2$, $n = 0.5$

| Ratio of exist area/entry area | $R_1$ | $R_1/R_2$ | $Q$ |
|---|---|---|---|
| 1 | 0.188 | 0.115 | 4 |
| 2 | 0.266 | 0.163 | 4.8 |
| 5 | 0.419 | 0.258 | 6 |
| 26 | 0.956 | 0.59 | 9.1 |

It will be seen that considerable latitude is permissible in the ratio of exit area to entry area. In the last line of the preceding table the ratio of exit area to entry area is 26 and the ratio of $R_1/R_2$ is still comparable to the lower limit of coefficient of discharge for a sharp-edged orifice.

While the preferred ratio of exit area to entry area is one or more, it will be apparent that some advantage may be obtained when this ratio is less than one. In Example I, the diameter of an equivalent orifice for achieving the same control, was given as 3⁄16 inch. If the outlet hole in the vortex chamber of Example 1 was reduced to a 3⁄16 diameter, there would obviously be no advantage in the invention. That is, there would be no advantage when the ratio $$\frac{\text{Exit area}}{\text{Entry area}} = \frac{1}{4}$$

However the advantage obtained increases as this ratio increases from ¼ to 1. It has been found under many conditions of practice that an acceptable portion of the advantages of the invention may be achieved when the ratio of exit area to entry area is as low as ½.

Another characteristic of this invention is that the length of time, that is, the dwell time, during which the liquid is in the form of a vortex, is at a minimum. It is known to use vortices in other devices such as, for example, in centrifugal separators. While such separators use vortical flow, they perform a different function and are designed to have a very much larger dwell time to allow for the particles or fractions to separate.

Previously, it was mentioned that one of the disadvantages of using an orifice for a throttling device is that the velocity of the liquid is greatest past the orifice. This causes cavitation and wear of the orifice, enlarging it and increasing the flow. In the type of flow control device of this invention, the velocity past the entry opening is low and hence wear and cavitation at the entry area are negligible. The velocity is high at the exit or discharge opening and any wear which takes place will occur at the discharge opening. However, the size of the exit or discharge opening does not affect the flow to as great a degree as in the case of an orifice. This will be apparent from the table following Example I. Thus, the discharge opening may be worn excessively before any appreciable change in flow is apparent. The following example will give a further illustration of this.

*Example II*

Considering first a standard orifice of the size referred to in Example I of $\frac{3}{16}''$ in diameter, the flow from such a nozzle or orifice will approximately double when the nozzle is worn to $\frac{1}{4}''$ diameter. That is, the flow doubles as the nozzle area doubles. Considering now a device according to the present invention having dimensions as in the Example I device, it is seen that the $\frac{3}{8}''$ diameter discharge opening would have to wear to about $1\frac{1}{2}''$ in diameter to double the flow. This is because the flow varies as the ratio of the radii to the power of "$n$" which in this case is the square root of the ratio. This can be seen from Equation 10. It is thus apparent that the flow control device of this invention is not affected by wear to as great an extent as a prior art valve.

It is an important characteristic of the invention that it partly compensates for viscosity changes in the liquid passing through it. Since the fluid friction losses are influenced by viscosity, the value of "$n$" will be influenced by liquid viscosity. The higher friction losses give values of "$n$" which lead to a greater flow through the vortex. This is in contrast to decreased flow through an orifice caused by increased viscosity. This effect is useful where the device of this invention is employed to control the continuous discharge of a liquid having a suspension of solids of a viscous nature, especially where thickening occurs. A change in the solids content leads to viscosity changes which automatically causes the rate of flow to change. This partly compensates for the change in solids content by discharging a greater or lesser volume.

In the throttling device shown in FIGURES 1 and 2, the wall 12 is circular. It is, of course, easier to fabricate a throttling device where the side wall has a circular configuration, and also it is easier to make certain calculations when a circular configuration is used. However, the ideal shape for the casing wall is that of a single turn logarithmic spiral configuration because a logarithmic spiral is the shape of the path followed by a particle in a free vortex. An arithmetic spiral approaches this and is also a suitable shape. For ease of fabrication, however, the circular shape of FIGURES 1 and 2 is desirable and performs satisfactorily. A spiral configuration is an obvious alternative. Departure from smoothly curved walls of these shapes will give poorer results.

A throttling device according to an embodiment of this invention having an adjustable entry area as shown in FIGURES 3 and 4, and will now be described. The throttling device of FIGURES 3 and 4 is also shown as having a spiral shaped side wall 12a for the purpose of illustrating this alternative wall configuration, however, it will be realized that the throttling device could also have a circular configuration of the side wall. The adjustable entry area of this embodiment may be used with any of the curved side wall configurations previously discussed.

In FIGURES 3 and 4, a flange 20 is provided for connection to a piping system and a short pipe piece 14 is fastened to it. A transition piece or nozzle piece 15a is connected between pipe 14 and spiral casing 12a. The nozzle piece 15a performs the transition from the pipe of circular cross section to a rectangular cross section. An inlet area having a curved periphery, such as shown in FIGURES 1 and 2, could be used. The shape of the inlet area should be such as to induce the best vortex formation. A rectangular or square inlet will permit the liquid to fill the whole area of its path between the plates and consequently is preferred. This is particularly so where a spiral casing is employed. If the entry is not coextensive with the beginning of the vortex path, that is, if the entry area does not completely fill the space between discs 10 and 11, there will be some loss of entry velocity and consequently some reduction in efficiency.

In FIGURES 3 and 4, the rectangular entry area 16a is formed by the discs 10 and 11, the portion 21 of wall 12a, and the gate vane 22. The gate vane 22 is fastened to a screw 23 which extends through the threaded hub 24 of wheel 25. The hub or collar 24 is provided with a groove 26 which receives portions 27 of the main frame of the device. Rotation of wheel 25 will cause the vane 22 to move inwards and outwards guided by guide members 28. A packing gland 30 prevents leakage around the vane.

It will, of course, be apparent that other means of adjusting the position of the vane and thereby varying the inlet area would also operate satisfactorily.

A discharge outlet 17a is positioned approximately at the center of the spiral, and a splash guard 18 directs the discharged liquid.

In a device as shown in FIGURES 3 and 4, the spiral is selected for the normal operating conditions with the vane in its most usual position. The best control characteristics will be obtained at this design setting. Moving the vane will change the entry area and thus the flow in proportion. This relationship is proportional except at extreme settings, that is, more than the expected amount will be passed at a nearly closed gate setting. This is due to variations in fluid friction with dwell time in the vortex.

It should be noted that most gate valves have a guide along the sides of the gate and extending across the entry area to take the thrust of pressure drop against the gate. Such guides are not necessary where the device of FIGURES 3 and 4 is used to control liquid flow. This is because the pressure drop is across the vortex rather than the gate. Such guides would, however, be necessary if the device were to be used to shut off the flow entirely. Indeed, the vane 22 may be made flexible if the device is not to shut off the flow of the liquid. If the vane 22 were flexible, it would deflect when a pressure drop developed across it. Thus, if an oversize particle were to wedge in the opening 16a, the resultant build-up of pressure would deflect vane 22 and permit the particle to pass.

The method of controlling the flow of liquids as set forth herein and the device therefor may be used in many applications. For example, it may be used in the control of flow of solids rejection from a centrifugal cleaner device such as that described in United States Patent No. 2,927,693, issued March 8, 1960. As another example, it may be used to control the flow of a mixture of wood chips and water where difficulty is experienced with conventional valves blocking up. The invention may also be used to advantage, as another example, in controlling the flow from a continuous digester used in the pulping of wood chips. An additional advantage in use of the device to control such a flow might be that the shear in the vortex would tend to break up soft chips.

It will be apparent that the method of controlling fluid flow and the device therefor, as disclosed herein, will provide a throttling of the fluid with less wear at the input and which is less likely to block than a corresponding customary orifice.

Modifications of this invention will occur to those skilled in the art and it is intended to include all such modifications that fall within the true spirit and scope of the invention.

I claim:

1. A device for controlling the flow of a liquid, comprising
   an enclosure having an unobstructed interior defined by a continuously curved side wall and a pair of flat, parallel end walls,
      said side wall being provided with an inlet opening extending substantially from one end wall to the other and having a first area,
      one of said end walls being provided with a centrally located outlet opening having a second area substantially equal to the first area,
   an inlet pipe connected to the enclosure at said inlet opening for directing a liquid tangentially into said enclosure through said inlet to form a liquid vortex,
   a movable gate located at said inlet opening positioned in the inlet liquid opening path, and
   means moving the gate to obstruct the path by varying amounts.

2. A device for controlling the flow of a liquid, comprising
   an enclosure having an unobstructed interior defined by a continuously curved side wall and a pair of flat, vertically spaced, horizontal end walls,
      said side wall being provided with a rectangularly shaped inlet opening extending from one end wall to the other and having a predetermined entry area,
      the lower one of said end walls being provided with a centrally located circular opening having a predetermined exit area,
      the ratio of said exit area to said entry area being greater than one half,
   an inlet pipe connected to the enclosure at said inlet opening for directing a liquid tangentially into said enclosure through said inlet to form a liquid vortex in said enclosure,
   a movable flexible gate extending vertically from one end wall to the other located at said inlet opening and slidably mounted for movement across said inlet opening,
      said gate being so constructed and arranged to deflect in response to a predetermined pressure differential across it, and
   means moving said gate across said inlet opening to vary the size thereof.

3. A device for controlling the flow of a liquid, comprising
   an enclosure having an unobstructed interior defined by a continuously curved side wall of simple spiral configuration and a pair of flat, vertically spaced, horizontal end walls,
      said side wall being provided with a rectangularly shaped inlet opening located at the beginning of said spiral extending from one end wall to the other and having a predetermined entry area,
      the lower one of said end walls being provided with a centrally located circular opening having a predetermined exit area,
      said exit area being equal to said entry area,
   an inlet pipe connected to the enclosure at said inlet opening for directing a liquid tangentially into said enclosure through said inlet to form a liquid vortex in said enclosure,
   a movable flexible gate extending vertically from one end wall to the other slidably mounted for movement across said inlet opening at the side of the inlet opening where the spiral is smaller,
      said gate being so constructed and arranged to deflect in response to a predetermined pressure differential across it, and
   means moving said gate across said inlet opening to vary the size thereof.

References Cited by the Examiner

UNITED STATES PATENTS

| 2,139,736 | 12/38 | Durham | 181—58 |
| 2,634,109 | 4/53 | Zachariassen | 259—4 |
| 3,093,468 | 6/63 | Krochta | 55—460 X |

FOREIGN PATENTS

| 507,713 | 9/30 | Germany. |
| 653,627 | 5/51 | Great Britain. |

LAVERNE D. GEIGER, *Primary Examiner.*

EDWARD V. BENHAM, *Examiner.*